C. B. Normand,
Scroll Sawing Machine.
N° 11,946.    Patented Nov. 14, 1854.
3 Sheets. Sheet 1.
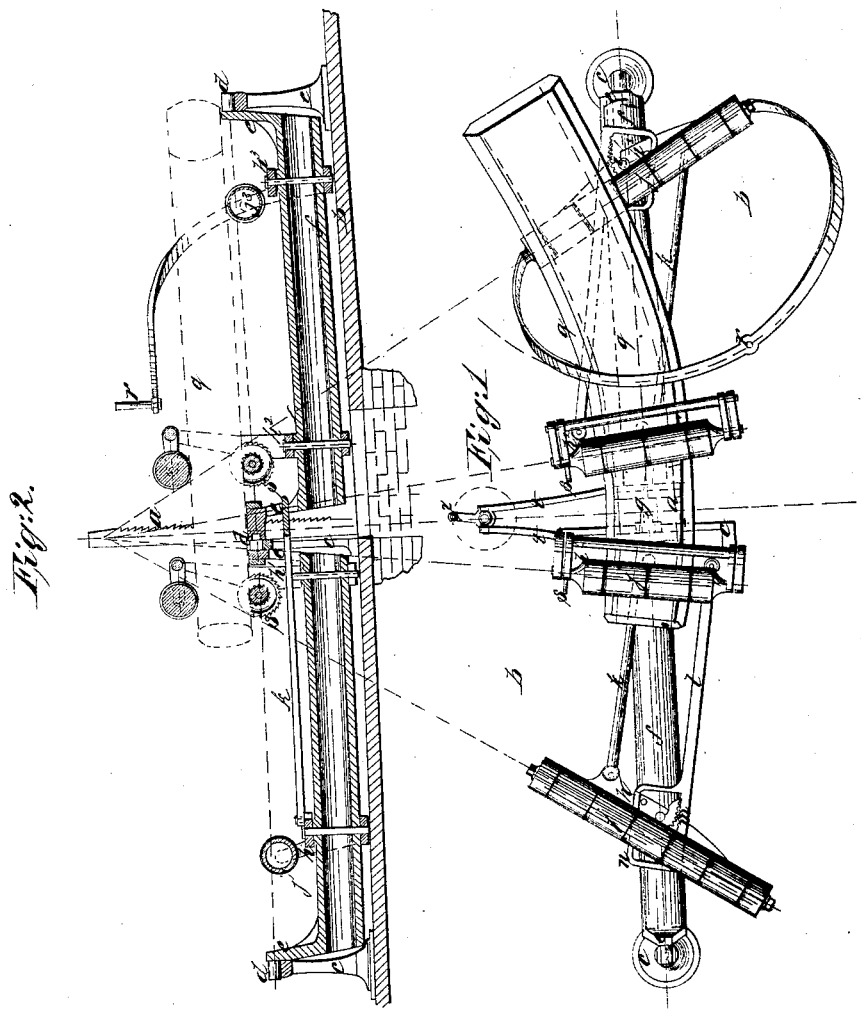
Witnesses:
Inventor:

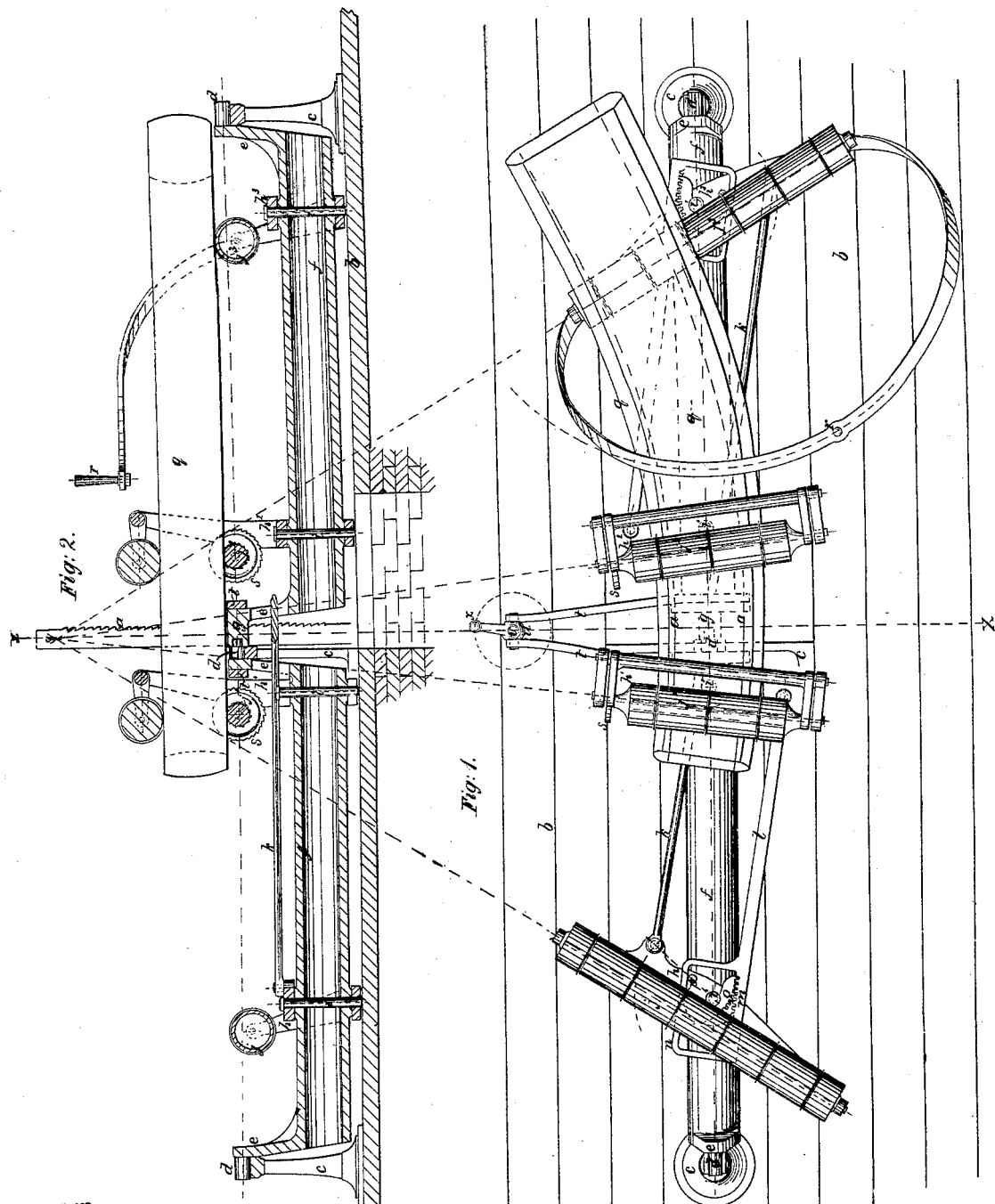

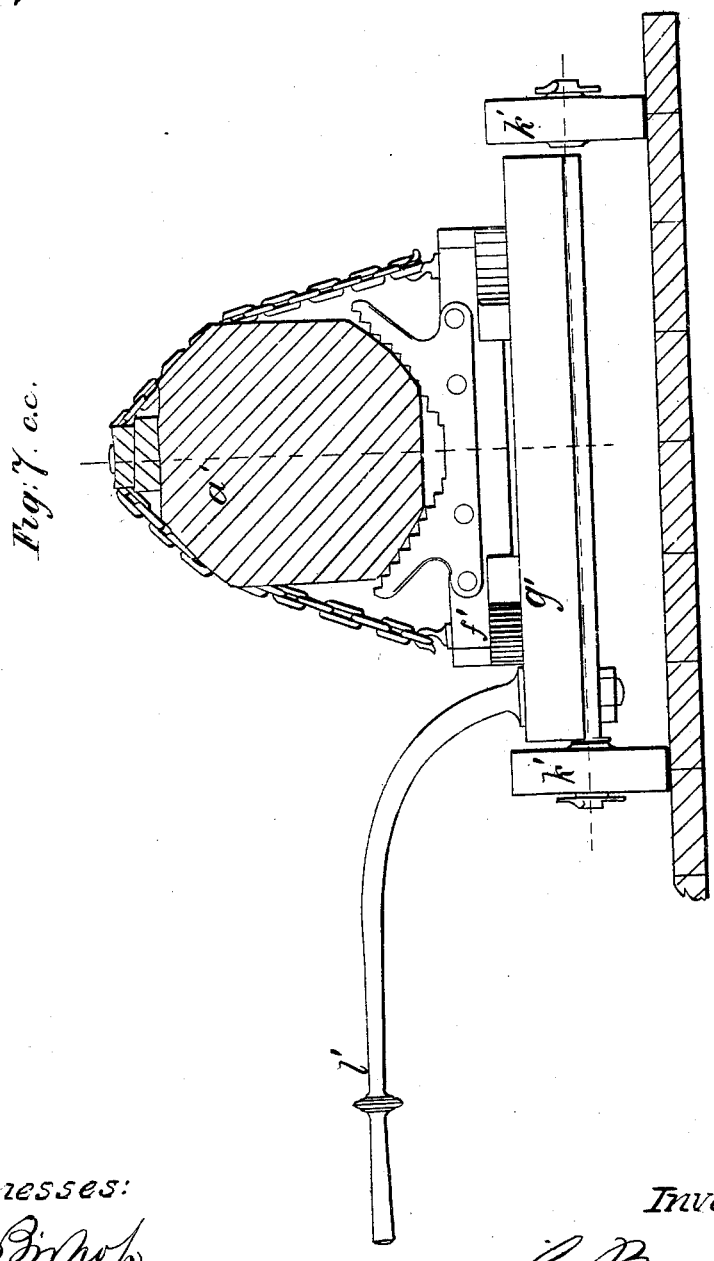

UNITED STATES PATENT OFFICE.

C. B. NORMAND, OF HAVRE, FRANCE.

METHOD OF CONTROLLING LOGS FOR CURVED AND BEVEL SAWING.

Specification of Letters Patent No. 11,946, dated November 14, 1854.

*To all whom it may concern:*

Be it known that I, C. B. NORMAND, of Havre, France, have invented certain Improvements in Sawmills for Curved and Bevel Sawing, but which may also be Used for Rectilinear Sawing, of which the following is a full, clear, and exact description, reference being had to the accompanying drawings, making part of this specification, in which—

Figure 1, is a plan of the mechanism for controlling and directing the timber to the saw or saws; Fig. 2, a longitudinal vertical section; Fig. 3, a cross vertical section thereof; and Fig. 4, is a plan of a modification of my said invention; and Figs. 5, 6, and 7, vertical sections thereof, taken at the lines A, a, B, b, and C, c, of Fig. 4.

The same letters will be used to indicate like parts whenever they appear in Figs. 1, 2, and 3, and the same course will be pursued in indicating the several parts in Figs. 4, 5, 6 and 7.

My invention is specially designed for sawing ship or other timbers in the various curves and bevels required, by a mechanism whose mode of operation or principle is such, however varied in the mere mode of construction, that the motion of the log is directed to the saw or saws in the lines of the required cuts, without the necessity of changing the plane of the saw or saws, and so that, at any time, the attendant can, whether before, or during the operation of sawing, shift suddenly or gradually, the directing function of the mechanism, and thus produce surfaces of any extent or variety of curvatures or bevels, and whether regular or variable from end to end of the log.

Many machines have been invented and constructed for this purpose, but all more or less defective, as, for instance, the log has been secured on a carriage turning on a center, on a line at right angles to the plane of the saw. This presents and moves the log to the saw in a proper manner, for efficient cutting, but as the carriage turns on a fixed center this is only adapted to sawing arcs of perfect circles, although by shifting the axis nearer to, or farther from the plane of the saw before starting, circles of greater or less radius can be cut. The capacity of this method is too limited. Again, the log has been mounted on a compound carriage, the first or base carriage moving longitudinally to carry the log toward the saw, and the second mounted on the first and moving at right angles to it, so as to generate the form of the line of cut by the combination of these two motions at right angles to each other, the curvature being determined either by a guide of the required form of the side or by the attendant. But this is objectionable for the reasons that the saw or saws must be hung on pivots or journals in the saw gate so as to be turned to follow the varying direction of the curvature. If the saw be strained to the required tension for efficiency in cutting it will be very difficult to turn, and if turned by hand, it is difficult to guide, and if turned by mechanism connected with a guide at the side, the complexity and liability to derangement becomes seriously objectionable. Besides the use of a compound carriage for generating the required curvature, presents serious objections on account of complexity and friction of the moving parts, which cannot be controlled by an attendant, and therefore necessitates the use of mechanical guides that add greatly to the cost of the machine, as a different guide is required for every different curve required. And besides on this plan it becomes very difficult to give efficient support to the log, where required, in close proximity to the saw. With a view to remedy some of the evils of the method above indicated, the log has been placed on a single carriage having a longitudinal motion in the manner of the common saw mill, and the curvature or curvatures have been obtained by hanging the saw or saws on pivots or journals in a second saw guide, so mounted in the main saw gate as to be free to slide laterally therein, so that either by hand or by mechanical guides at the sides, the required curves could be generated. But this, in reality, presents all the objections of the previous plan, although they may be less prominent. All these relate to longitudinal curvature; but, for bevel sawing, the mode generally adopted heretofore, is to hang the log at both ends to chucks on turning mandrels mounted on the ends of the carriage, so as to determine and give the required bevel by turning the chucks with the log. The objections to this plan, are, difficulty of so holding and supporting heavy logs, of so constructing the chucks as to enable the saws to cut through the end of the logs, and especially of giving to both ends of the saw blades the same angular and lateral motion when properly strained for rapid and exact operation.

By my invention I avoid all the serious difficulties of the several methods heretofore practised, and I am enabled thereby so to direct the log, that the plane of the saw, without shifting or turning it is always tangent to the curve whatever may be its direction or radius, and however that may be changed in the progress of the log. And this I effect by directing the motion of the log toward the saw by supporting it on rollers, whose axes always converge or nearly converge to a common point on a line at right angles to the face of the saw, which point becomes the center of motion of the log, and so arranged, that the said rollers can be shifted at any time, either before or during the sawing operation, so as to shift the convergence nearer to, or farther from the saw, or reverse it from side to side, and thus vary the radius, or reverse the direction of the curvature. It is this mode of operation for directing the log to the saw or saws, which constitutes the first part of my invention. And the second part of my invention, which relates to the method of directing and varying the bevel of the surfaces to be cut by the saw or saws, consists, in mounting the rollers which support the log in a swinging or vibrating frame or frames, so that the said rollers can be placed at any desired angle with the plane of motion of the saw, and there retained, or gradually shifted in either direction during the sawing operation, whereby the log can be sawed to any fixed and determined bevel, or to any bevel, varying in any desired degree from end to end.

Having thus pointed out the modes of operation heretofore practiced, and what I deem to be their defects and also pointed out the principle or mode of operation which distinguishes my invention from all other things before known, I will now describe minutely the mode of construction which I deem the best together with one modification thereof.

In Figs. 1, 2 and 3, of the accompanying drawings $a$, $a$, represent the saws, which may be mounted, strained and operated in any known or suitable mode for straight sawing, and $b$, represents the floor or other suitable platform, on which are erected three standards $c$, $c$, $c$, with suitable semi-cylindrical boxes at top to receive the journals $d$, $d$, $d$, near the upper ends of crank arms $e$, $e$, $e$, $e$, on the ends of two longitudinal shafts $f$, $f$, which I prefer to make tubular to avoid weight and to obtain the required stiffness. There is one such crank arm at each end of each of these shafts; but one of these crank arms, instead of having a journal like the other three, is provided with a stem $g$ having a socket, to receive the end of the journal $d$ of the next adjoining crank arm. This mode of suspending the shafts $f$, $f$, affords sufficient space for the free working of the saws. Four frames $h$, $h'$, $h^2$, $h^3$ are connected with these two shafts $f$, $f$, one near each end, by means of spindles $i$, $i$, $i$, $i$, passing through the shafts and perpendicular to the horizontal axis of the journals $d$, $d$, $d$, upon which spindles the several frames $h$, will be free to vibrate. And the four frames carry each a sustaining roller, marked $j$, $j'$, $j^2$, $j^3$, their journals being fitted to turn freely in suitable boxes in the upper part of the frames $h$ $h'$ $h^2$ $h^3$, and so situated that the upper surfaces of the four rollers will be in one and the same plane; and these four frames are so connected together that when either of them is turned on its spindle, they will all turn together, and so that the axis of all four will converge on the right or left toward one common point in a vertical transverse plane X, X, perpendicular to the plane of the saw; this point becomes then the center of motion of the piece of timber borne on the rollers and operated upon. As these frames are turned on their spindles, the center to which the axis of all the rollers converge will approach to, or recede from the plane of the saw thus increasing or reducing the radius of motion. The manner in which these frames are connected for this purpose is thus: A connecting rod $k$, is jointed at one end to the frame $h$, on one side of its spindle, and at the other end with the other frame $h^3$ on the other side of its spindle. The connections of this rod with the two extreme frames being on opposite sides of their spindles and at equal distances therefrom, it follows that when one end of one is moved in one direction, the corresponding end of the other will move over an equal arc in the opposite direction, and vice versa. The frame $h$, is connected with the frame $h'$, by another connecting rod $l$, one end of which is jointed by a pin with the frame $h'$, on one side of its spindle, and the other end is provided with a straight cogged rack $m$, and a yoke $n$. The rack teeth engage the cogs of a sector rack or cog wheel $o$, attached to the frame $h$, with its sector of cogs much nearer the spindle of the frame than the length of its radius, so that when the frame is vibrated either way from a position at right angles with the line of the shaft $f$, it shall act on the connecting rod in the manner of a progressive lever to preserve between the several frames $h$, $h'$, $h^2$, $h^3$, during their angular motions the necessary and variable relations required by the convergence of the rollers. The yoke $n$, embraces the sector cog wheel and pin $p$, to keep the teeth of the rack and of the sector always in gear. The frame $h^3$, is connected with the frame $h^2$, precisely in the same manner as the frame $h$, is connected with the frame $h'$. From this it will be seen that by simply turning the frame $n$, in either direction, all the frames will be turned simultaneously, with the line of the axis of their rollers all converging to one common but movable center.

A log $q$, or other piece of timber previously slabbed or sided being placed on the rollers and moved or fed toward the cutting edge of the saw it will be seen that the direction of the motion of this log toward the cutting edge will depend entirely upon the position of the rollers. If they are parallel with each other the log will move in a straight line; if the frames be turned, the axis of the four converging to a common center on one side of the saw, then the log will move in a circle of which a line from it to that common center will be the radius, whatever that distance may be, and vice versa, if the frames be turned in the opposite direction. The operative, therefore, by tracing a line on the upper surface of the log or timber, and taking the handle $r$, of the bow frame, on the frame $h^3$, in his hand, can direct the log or timber in any direction desired, and vary it at pleasure, either before or during the working of the saw, and thus cut the log or timber in any direction whether straight or curved, and with the curve in any desired direction or of any desired radius.

The two rollers of the frames $h'$, $h^2$, are provided with a ratchet wheel $s$, $s$, operated by hand or pawl as in the usual mode of feeding. But any suitable mode of giving the feed motion may be adopted, as this makes no part of my invention.

The two inner crank arms of the shafts $f$, $f$, have attached to them, at right angles, two other arms $t$, $t$, that are connected at their outer ends, to journals or wrists projecting from a collar $u$, at the upper end of a screw shaft $v$, which is tapped in a nut $w$, swiveled to the floor or platform of the mill.

The screw shaft is provided with a crank handle $x$, so that by turning the said screw in either direction, the shafts $f$, $f$, will be made to swing in either direction on the journals of their crank arms, carrying with them the frames $h$, $h'$, $h^2$, $h^3$, with their rollers; and thus place the log or timber resting on them, at any desired angle with the plane of motion of the saw or saws, to give any desired angle or bevel to the surface being cut, the angle being the same throughout the length, and set before hand, or gradually changed to the required extent during the sawing operation, either by hand or by a separate variable feed motion which neds no description.

I have thus described that mode of construction for both parts of my invention which I have tried with success and which I deem the best; but I do not wish to be understood as limiting myself to such mode of construction, as it may be greatly varied by the mere substitution of mechanical equivalents; thus obtaining the same ends by analogous means. Nor do I wish to be understood as limiting myself to the use of both parts of my invention in connection, as they can be used independently of each other to some advantage, although the capacity of the mechanism will be thereby limited, as for instance: I have contemplated the application of the principle of my invention in a simple form, for the purpose of curvilinear sawing on logs which have not been slabbed or sided; but the mode of operation will be found to be the same in this mode of application as represented at Figs. 4, 5, 6, and 7, of the accompanying drawings, where the log $a'$, not previously slabbed or sided, rests on two rollers $b'$, $b'$, mounted in standards $c'$, $c'$, and one in front, and the other back of the saws $d'$. The usual feed motion can be applied to a ratchet wheel $e'$, on the arbor of either roller, and in the usual and well known mode. The other end of the log is properly secured by chains, wedges and dogs to the top of a bolster $f'$, swiveled by a king bolt in the usual manner to a platform $g'$, mounted on a pair of wheels $k'$, $k'$, which run freely on the floor or platform of the mill. The axle tree is provided with a hand lever $l'$ by which the direction of the axes of the two wheels can be shifted at pleasure.

It will be seen that when the axis is placed in a line parallel to the axes of the rollers $b'$, the log will travel in a straight line toward the saw, and will be cut along a straight line, but the moment the axis is inclined, so that it will intersect, at some point, the prolonged axis of the roller bearing the log near the saws on either side of it, and at any desired distance therefrom, that moment the log will travel in arcs of circles of which the said point of intersection will be the center. In this way, the mode of operation of the first part of my invention can be readily applied to the sawing of logs in any desired curve without previously siding or slabbing.

It will be obvious to the mechanician that, (from the foregoing) the mode of operation, which I have pointed out as constituting my invention, for directing the log or timber for sawing curves or bevels, may be applied under a great variety of merely formal variations in the mechanical devices or instruments, by the substitution of mechanical equivalents; and, therefore, I wish it to be distinctly understood that I do not limit myself to the mere mechanical construction as specified, so long as the same ends are obtained by analogous devices.

What I claim as my invention and desire to secure by Letters Patent is—

1. The mode of operation, substantially as specified, for directing the log or timber to the saw or saws in curvilinear sawing, by means of rollers or their equivalents, whose axes can be shifted at pleasure, as herein specified, to determine and vary the line of motion of the log or timber to the saw or saws, without the necessity of turning or moving the saw or saws laterally, substantially as described.

2. And I also claim mounting the rollers, which support the log, or timber to be sawed, in a swing or vibrating frame, or the equivalent therefor substantially as specified, so that the plane tangent to the upper edges of the rollers can be placed at any desired angle with the plane of motion of the saw, and there retained or gradually shifted in either direction during the sawing operation, whereby the log or timber can be sawed to any fixed and determined bevel, or to any bevel varying in any desired degree, as set forth.

C. B. NORMAND.

Witnesses:
WM. H. BISHOP,
ANDREW DE LACY.